Patented Dec. 9, 1952

2,621,189

UNITED STATES PATENT OFFICE 2,621,189

CHROMANONE COMPOUNDS

Paul F. Wiley, Indianapolis, Ind., assignor to Eli Lilly and Company, Indianapolis, Ind., a corporation of Indiana No Drawing. Application January 10, 1951, Serial No. 205,417

10 Claims. (Cl. 260—333)

This invention relates to organic chemical compounds, and more particularly to substituted 3 - dimethylaminomethylchroman - 4 - ones and their acid addition salts.

The compounds of this invention when in basic form are represented by the formula:

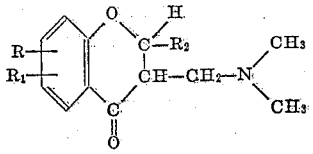

wherein R and $R_1$ each represent members of the group consisting of H, OH, lower alkoxy, lower alkyl, and halogen, and $R_2$ represents a member of the group consisting of hydrogen and methyl. As used herein, the terms "lower alkoxy" and "lower alkyl" signify radicals having from 1 to 5 carbon atoms.

The novel chromanones are liquids at ordinary temperatures, and since they contain a basic nitrogen atom, are capable of forming acid addition salts with acids. The salts are generally crystalline, non-hygroscopic, water-soluble substances when formed with inorganic or mineral acids, and are generally water-insoluble when formed with organic acids of high molecular weight. The new compounds and their salts are effective amoebicides.

The dimethylaminomethyl - chromanones of this invention can be prepared by treating a suitably substituted chromanone with an acid addition salt of dimethylamine in the presence of formaldehyde, according to the procedure of the well-known Mannich reaction. The substituted chromanones used as starting materials are known to the art, and methods for their preparation have been reported by Gottesmann, Ber. 66, 1168, (1933); Pfeiffer et al., Ber. 58, 1947 (1925); and Ber. 57, 208 (1924); Birch et al., J. Chem. Soc., 1936, 1832; and Chakravarti et al., J. Indian Chem. Soc., 16, 639, (1939).

By the process of their preparation as broadly set forth above, the new compounds are obtained in the form of their acid addition salts. The substituted 3 - dimethylaminomethyl chroman - 4- ones are readily obtained from such salts by methods known to the art, as for example, by treating a water solution of the salt with an alkali, followed by extraction with ether and evaporation of the ether extract. The residue from evaporation is the free base of the chromanone.

The acid addition salts of the new substituted 3-dimethylaminomethylchroman-4-ones which are included within the scope of the invention are the non-toxic, therapeutically useful salts. By the term "non-toxic, therapeutically useful" is meant those salts whose toxicity is not substantially greater than that of the free base, and which are suitable for incorporation into the therapeutic preparations in which it is contemplated the new compounds will be employed. Examples of suitable salts are acid addition salts with mineral acids such as, for example, hydrochloric, nitric, sulfuric, and phosphoric acids and the like; and with organic acids, examples of which are acetic, propionic, benzoic, salicylic, succinic, citric and malonic acids and the like. The preparation of the acid addition salts of the new dimethylaminomethyl chromanones is readily accomplished by procedures known to the art, for example, by mixing stoichiometrically equivalent amounts of the desired chromanone base and the selected acid in a mutual solvent, and evaporating the mixture to dryness, whereupon the residue consists of the desired acid addition salt.

The following specific examples illustrate the preparation and properties of selected compounds of this invention.

EXAMPLE 1

*3 - dimethylaminomethyl - 6 - methoxychroman-
4-one hydrochloride*

A mixture of 72.6 g. (0.41 mol) of 6-methoxychroman-4-one, 34.3 g. (0.42 mol) of dimethylamine hydrochloride, 24.4 g. (0.81 mol) of paraformaldehyde, and 125 cc. of absolute alcohol was refluxed for about 3 hours. The resulting clear solution was kept under refrigeration until the slow crystallization of the 3-dimethylaminomethyl-6-methoxychroman-4-one hydrochloride which was formed in the reaction was complete. The precipitate was filtered off and recrystallized from alcohol.

3 - dimethylaminomethyl - 6 - methoxychroman-4-one hydrochloride thus prepared melted at about 157–159° C. Analysis showed the presence of 5.21 percent nitrogen and 12.98 percent chlorine as compared with the calculated amounts of 5.15 percent nitrogen and 13.07 percent chlorine.

EXAMPLE 2

*3 - dimethylaminomethyl - 5,8 - dimethoxychroman-4-one hydrochloride*

A mixture of 5 g. (0.026 mol) of 5,8-dimethoxychroman-4-one, 2.3 g. (0.028 mol) of dimethylamine hydrochloride, 1.6 g. (0.052 mol) of paraformaldehyde, and 20 cc. of absolute ethanol was refluxed for 24 hours. The solvent was removed by evaporation under reduced pressure, and the residue, comprising 3-dimethylaminomethyl-5,8-dimethoxychroman-4-one hydrochloride, was dissolved in 100 cc. of water. The aqueous solution was washed with three 25 cc. portions of ether which were discarded, and the extracted aqueous solution was treated with charcoal, the charcoal filtered off, and the filtrate evaporated to dryness in vacuo. The residue of 3-dimethylaminomethyl - 5,8 - dimethoxychroman - 4 - one hydrochloride was crystallized from absolute alcohol-ether, and recrystallized three times from absolute alcohol.

3 - dimethylaminomethyl - 5,8 - dimethoxychroman-4-one hydrochloride thus prepared melted at about 148–150° C. Analysis showed the presence of 55.54 percent carbon, 7.40 percent hydrogen, and 10.85 percent chlorine, as compared with the calculated amounts of 55.64 percent carbon, 6.63 percent hydrogen, and 11.72 percent chlorine.

EXAMPLE 3

*3-dimethylaminomethyl-6-methoxychroman-4-one*

A solution of 20 g. (0.074 mol) of 3-dimethylaminomethyl-6-methoxychroman-4-one hydrochloride in 200 cc. of water was treated with 4 g. (0.1 mol) of sodium hydroxide. The organic phase which appeared was extracted with three 100 cc. portions of ether, the ether extracts were united and evaporated to dryness under reduced pressure and at a temperature of about 20° C. The residue, comprising 3-dimethylaminomethyl-6-methoxychroman-4-one, was a mobile liquid which was unstable at elevated temperatures. Analysis showed the presence of 6.23 percent nitrogen as compared with the calculated amount of 5.96 percent nitrogen.

EXAMPLE 4

*3-dimethylaminomethyl-6-bromochroman-4-one hydrochloride*

A suspension of 41.3 g. (0.17 mol) of β-(p-bromophenoxy)-propionic acid, which was prepared according to the procedure of Hall and Stern, J. Chem. Soc., 1949, 2035, in 330 cc. of dry benzene was stirred vigorously while 70.5 g. (0.34 mol) of phosphorus pentachloride were added slowly. The reaction mixture was heated to boiling, and then cooled rapidly in an ice bath, and 73 g. (0.55 mol) of anhydrous aluminum chloride were added slowly with continued stirring. Thereafter, the reaction mixture was stirred for two hours at room temperature. The reaction mixture was poured over a mixture of 650 g. of cracked ice and 58 cc. of concentrated hydrochloric acid. The benzene layer, containing the 6-bromochroman-4-one formed in the reaction, was removed and washed successively with 100 cc. portions of water, 10 percent sodium carbonate solution, and water. The benzene was distilled off and the residue was distilled in vacuo.

6-bromochroman-4-one thus prepared boiled at 91–100° C. at a pressure of 0.15 mm. of mercury. It solidified on cooling. After recrystallization from alcohol it melted at about 76–79° C. Analysis showed the presence of 35.08 percent bromine as compared with the calculated amount of 35.24 percent bromine.

The 6-bromochroman-4-one was treated with dimethylamine and paraformaldehyde according to the procedure of Example 1, to yield 3-dimethylaminomethyl-6-bromochroman-4-one hydrochloride.

3-dimethylaminomethyl-6-bromochroman - 4 - one hydrochloride thus prepared melted at about 158–160° C. Analysis showed the presence of 4.40 percent nitrogen and 11.17 percent chlorine as compared with the calculated amounts of 4.37 percent nitrogen and 11.06 percent chlorine.

EXAMPLE 5

*3-dimethylaminomethylchroman-4-one hydrochloride*

The procedure of Example 1 was followed, except that an equivalent amount of chroman-4-one was used in place of 6-methoxychroman-4-one.

3-dimethylaminomethylchroman-4-one hydrochloride thus prepared melted at about 165–167° C. Analysis showed the presence of 14.71 percent of chlorine compared with the calculated amount of 14.70 percent chlorine.

EXAMPLE 6

*3-dimethylaminomethyl-6-hydroxychroman-4-one hydrochloride*

The procedure of Example 2 was repeated, except that an equivalent amount of 6-hydroxychroman-4-one was used in place of 5,8-dimethoxychroman-4-one.

3 - dimethylaminomethyl-6-hydroxychroman-4-one hydrochloride thus prepared melted at about 175–178° C. Analysis showed the presence of 13.37 percent chlorine as compared with the calculated amount of 13.76 percent chlorine.

EXAMPLE 7

*2-methyl-3-dimethylaminomethyl-6-methoxychroman-4-one hydrochloride*

A suspension of 9.6 g. (0.4 mol) of sodium hydride in 300 cc. of dry benzene was stirred vigorously while slowly adding a solution of 33.2 g. (0.2 mol) of 2-hydroxy-5-methoxyacetophenone in 56.8 g. (0.6 mol) of dry ethyl acetate. The reaction mixture was stirred overnight at room temperature, and then acidified with 30 cc. of concentrated hydrochloric acid. Sufficient water was added to dissolve all of the inorganic salts formed, and the mixture was extracted with three 200 cc. portions of ether. The combined ether extracts were evaporated, the residue was dissolved in 400 cc. of ether, and washed with 160 cc. of saturated aqueous sodium bicarbonate followed by two 100 cc. portions of water. The washed ether solution was dried over magnesium sulfate, and the ether was evaporated. The residue was dissolved in a mixture of 100 cc. of glacial acetic acid and 4 cc. of concentrated hydrochloric acid, and the solution was refluxed for 15 minutes. The solution was cooled and poured into 500 cc. of water, and sufficient sodium carbonate was added to bring it to about pH 7. A precipitate, comprising 2-methyl-6-methoxychromone which separated, was filtered off and recrystallized from alcohol.

2-methyl-6-methoxychromone thus prepared melted at about 102–106° C. Analysis showed the presence of 69.68 percent carbon and 5.39 percent hydrogen as compared with the calculated amounts of 69.48 percent carbon and 5.27 percent hydrogen.

A solution of 9.5 g. (0.05 mol) of 2-methyl-6- methoxychromone in 100 cc. of alcohol containing 5 cc. of concentrated hydrochloric acid was shaken with 0.1 g. of platinum oxide catalyst under hydrogen at an initial pressure of 50 pounds per square inch until the initial rapid reduction subsided. Another 0.1 g. portion of catalyst was added and reduction was continued, and the process was repeated until the theoretical amount of hydrogen had been consumed. The reaction mixture was filtered, and the filtrate was evaporated to dryness on a steam bath under reduced pressure. The residue, comprising 2-methyl-6-methoxychroman-4-one, was recrystallized from alcohol.

2-methyl-6-methoxychroman-4-one thus prepared melted at about 68–70° C. Analysis showed the presence of 69.03 percent carbon and 6.61 percent hydrogen as compared with the calculated amounts of 68.75 percent carbon and 6.24 percent hydrogen.

2-methyl-6-methoxychroman-4-one was treated with dimethylamine hydrochloride and paraformaldehyde by the procedure described in Example 2.

2-methyl-3-dimethylaminomethyl-6-methoxychroman-4-one hydrochloride thus prepared melted at about 172–174° C. Analysis showed the presence of 58.83 percent carbon, 7.30 percent hydrogen, and 12.33 percent chlorine, as compared with the calculated amounts of 58.84 percent carbon, 7.02 percent hydrogen, and 12.43 percent chlorine.

EXAMPLE 8

*3-dimethylaminomethyl-7-methoxychroman-4-one hydrochloride*

The procedure of Example 1 was followed, except that an equivalent amount of 7-methoxychroman-4-one was used in place of 6-methoxychroman-4-one.

3 - dimethylaminomethyl-7-methoxychroman-4-one hydrochloride thus prepared melted at about 167–168° C. Analysis showed the presence of 13.23 percent chlorine and 5.11 percent nitrogen, as compared with the calculated amounts of 13.07 percent chlorine and 5.15 percent nitrogen.

EXAMPLE 9

*3-dimethylaminomethyl-6,7-dimethoxychroman-4-one hydrochloride*

The procedure of Example 2 was followed except that an equivalent amount of 6,7-dimethoxychroman-4-one was employed in place of 6-methoxychroman-4-one.

3 - dimethylaminomethyl - 6,7-dimethoxychroman-4-one hydrochloride thus prepared melted at about 183–185° C. Analysis showed the presence of 55.64 percent carbon, 7.14 percent hydrogen, and 4.76 percent nitrogen, as compared with the calculated amounts of 55.74 percent carbon, 6.63 percent hydrogen, and 4.64 percent nitrogen.

EXAMPLE 10

*3-dimethylaminomethyl-6-ethoxychroman-4-one hydrochloride*

The procedure of Example 1 was repeated, except that an equivalent amount of 6-ethoxychroman-4-one was used in place of 6-methoxychroman-4-one.

3 - dimethylaminomethyl-6-ethoxychroman-4-one hydrochloride thus prepared melted at about 157–160° C. Analysis showed the presence of 4.93 percent nitrogen and 12.31 percent chlorine, as compared with the calculated amounts of 4.88 percent nitrogen and 12.41 percent chlorine.

EXAMPLE 11

*3-dimethylaminomethyl-6-methylchroman-4-one hydrochloride*

The procedure of Example 1 was repeated, except that an equivalent amount of 6-methylchroman-4-one was used in place of 6-methoxychroman-4-one.

3 -dimethylaminomethyl-6-methylchroman-4-one hydrochloride thus prepared melted at about 149–151° C. Analysis showed the presence of 5.48 percent nitrogen and 13.89 percent chlorine, as compared with the calculated amounts of 5.62 percent nitrogen and 13.65 percent chlorine.

EXAMPLE 12

*3-dimethylaminomethyl-7-chlorochroman-4-one hydrochloride*

The procedure of Example 4 was repeated, except that β-(m-chlorophenoxy)-propionic acid, prepared according to the method of Greshham et al. J. A. C. S. 71, 661 (1949) was used to prepare 7-chlorochroman-4-one. The 7-chlorochroman-4-one was reacted with dimethylamine hydrochloride and paraformaldehyde according to the process in Example 1.

3 - dimethylaminomethyl -7-chlorochroman-4-one hydrochloride thus prepared melted at about 154–156° C. Analysis showed the presence of 51.78 percent carbon, 5.30 percent hydrogen and 25.50 percent chlorine, as compared with the calculated amounts of 52.17 percent carbon, 5.44 percent hydrogen and 25.69 percent chlorine.

EXAMPLE 13

*3-dimethylaminomethyl-8-methoxychroman-4-one hydrochloride*

The procedure of Example 2 was repeated, except that 8-methoxychroman-4- one was used.

3 - dimethylaminomethyl-8-methoxychroman-4-one hydrochloride thus prepared melted at about 169–171° C. Analysis showed the presence of 4.98 percent nitrogen and 13.02 percent chlorine as compared with the calculated amounts of 5.15 percent nitrogen and 13.07 percent chlorine.

EXAMPLE 14

*3-dimethylaminomethyl-6-methoxychroman-4-one sulfate*

A solution of 23.5 g. (0.1 mol) of 3-dimethylaminomethyl-6-methoxychroman - 4 - one (prepared according to the procedure of Example 3) in 100 cc. of absolute ethanol, was treated with 4.9 g. (0.05 mol) of sulfuric acid. The solution was warmed upon a water bath for 30 minutes and was then evaporated to dryness. The residue, comprising 3 - dimethylaminomethyl - 6 - methoxychroman-4-one sulfate formed in the reaction, was dissolved in the minimum amount of hot absolute ethanol, and crystallized by the addition of ether. The crystalline 3 - dimethylaminomethyl-6-methoxychroman-4-one sulfate thus prepared was filtered off and dried.

In a similar manner were prepared the hydrobromide, phosphate, nitrate, sulfamate, benzoate, acetate, tartrate and salicylate salts of 3-dimethylaminomethyl - 6 - methoxychroman - 4 - one.

In like manner are prepared the acid addition salts of the other novel bases of this invention.

I claim:

1. A compound of the group consisting of the base represented by the formula

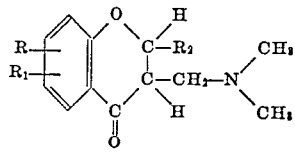

wherein R and R₁ each represent members of the group consisting of H, OH, lower alkoxy, lower alkyl and halogen, and R₂ represents a member of the group consisting of hydrogen and methyl, and acid addition salts thereof.

2. A compound represented by the formula

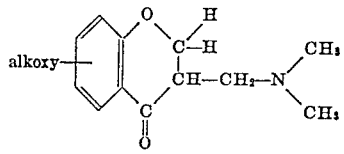

wherein "alkoxy" is a lower alkoxy radical.

3. A compound represented by the formula

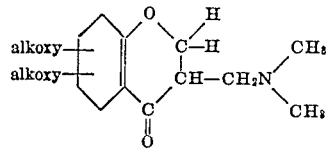

wherein each "alkoxy" is a lower alkoxy radical.

4. A compound represented by the formula:

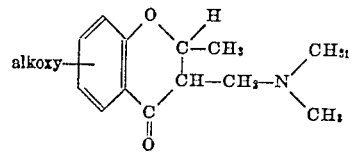

wherein "alkoxy" is a lower alkoxy radical.

5. A compound represented by the formula:

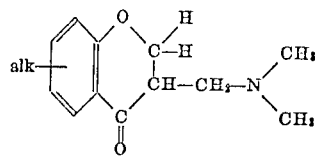

wherein "alk" is a lower alkyl radical.

6. 3 - dimethylaminomethyl - 6 - methoxychroman-4-one.

7. 3 - dimethylaminomethyl-6-hydrochroman-4-one.

8. 3 - dimethylaminomethyl - 6,7 - dimethoxychroman-4-one.

9. 3 - dimethylaminomethyl - 6 - methylchroman-4-one.

10. 3 - dimethylaminomethyl - 6 - ethoxychroman-4-one.

PAUL F. WILEY.

No references cited.